United States Patent Office 2,788,581
Patented Apr. 16, 1957

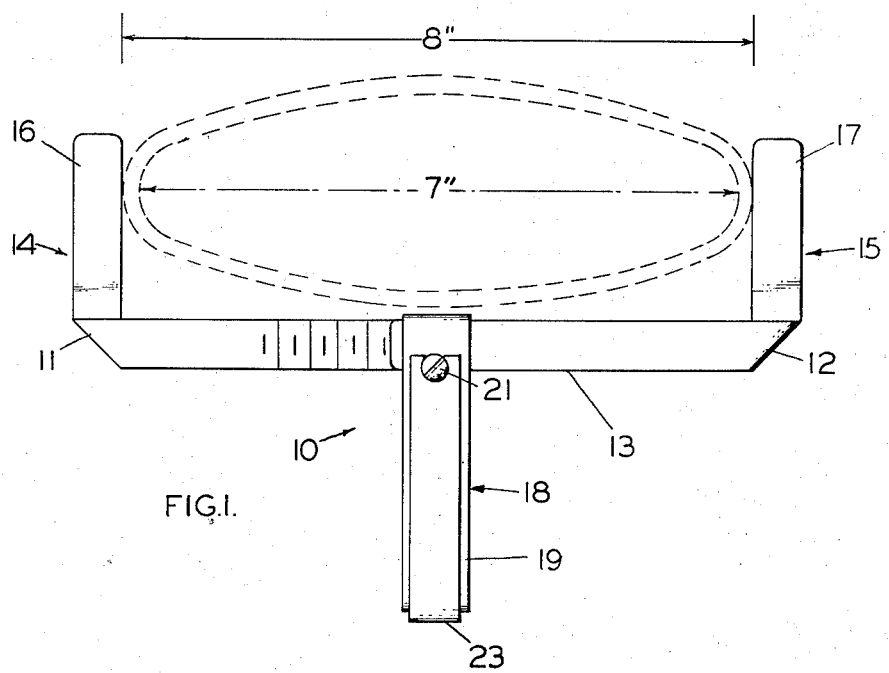
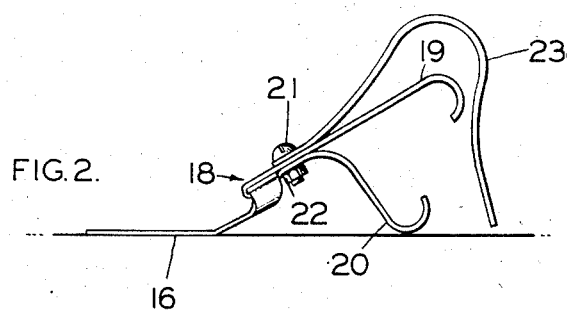
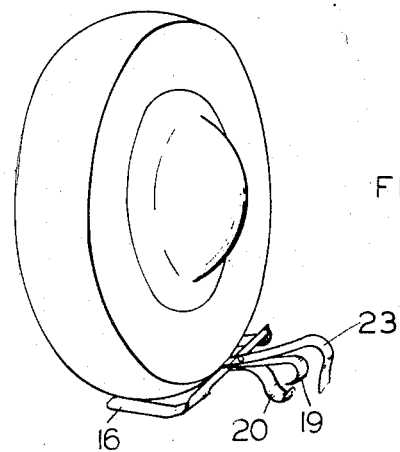

2,788,581

APPARATUS FOR TESTING TIRES

Bert R. Benjamin, Oak Park, Ill.

Application June 21, 1951, Serial No. 232,813

6 Claims. (Cl. 33—168)

This invention relates to the testing of pneumatic tires for automotive vehicles, and particularly to a novel method and means for determining the degree of inflation necessary for a pneumatic tire under load.

So-called low pressure tires are currently in wide use on automobiles and other vehicles, and are recommended by tire and automobile manufacturers and dealers for their improved riding qualities. For tires of this type manufacturers, dealers and service station attendants and others generally sponsor pressures as low as 24 pounds without regard to variations in load or other factors such as the age and physical condition of the tire. I have found that a low pressure automobile or truck tire inflated to only 24 pounds pressure wears out very rapidly. The result of under-inflation with respect to the load on the tire is that the marginal edge portions of the road engaging crown will bear most heavily on the road and the transversely central portion of the tread will tend to bulge radially inwardly and contact the road very lightly. The consequences are two-fold. The tread, instead of wearing uniformly, wears the greatest at the transverse marginal edges, and since the tire is subjected to severe flexing the reinforcing fibers are stretched and the side walls weakened.

Obviously, if the air in such a weakened tire is maintained at low pressure, the tire will tend to collapse more and more as the walls of the tire weaken, and the wearing of the tire increases so that its useful life is shortened considerably. On the other hand, an over-inflated tire has too small an area of contact with the ground and is subject to skidding on slick surfaces, and the central ribs of the tread receive the most wear.

By exhaustive tests I have found that to provide optimum conditions for tire wear and safety, three factors must be brought into balance, viz: (1) The load on the tire; (2) the air pressure in the tire, and (3) the safe limit of fiber stress in the tire. I have discovered that for maximum safety and wear the area of contact of a tire with the surface of the ground should remain substantially constant throughout the life of the tire. This contact area is oval in shape and its size is determined by the load on the wheel and the air pressure in the tire. These factors are also functions of the weakness of the tire walls resulting from age and abnormal flexing.

Furthermore, according to the instructions of tire and automobile manufacturers and others the air pressure recommended for a low pressure tire is not the same when the tire is cold as when it is hot, for the reason that when the air in the tire becomes heated it expands and increases the pressure, and to maintain proper air pressure under varying atmospheric onditions frequent checking is necessary. I have found that a high percentage of the tire gauges in use by service stations and garages are inaccurate, thus adding to the difficulties in the way of determining the air pressure in the tire. Also, in most automobiles there is a decided differential between the static loads upon the front and rear wheels, and this differential varies according to the make and model of the vehicle. Further, since the required inflation varies with the strength of the tire walls, the load, and the temperature, these difficulties are increased tremendously.

The present invention, therefore, has for its object the provision of a novel method and means of determining the correct degree of inflation of a tire under varying conditions, to obtain maximum wear and safety.

Another object of the invention is the provision of a novel method and means for quickly and easily checking a tire by measuring the length of the contact pattern of the tire upon the ground, this measurement being maintained constant throughout the life of the tire regardless of the temperature, age and structural condition of the tire.

Another object of the invention is to provide a novel and simple measuring device which may be applied to a loaded tire at any time with maximum acuracy and a minimum loss of time, to determine whether or not the tire is properly inflated.

Other objects of the invention and the advantages thereof will become clear from a consideration of the following detailed description, when read in conjunction with the acompanying drawings, wherein—

Figure 1 is a plan view of an embodiment of a tire measuring device for practicing this invention Figure 2 is an end elevation of the structure shown in Figure 1, and Figure 3 is a perspective view of the device of this invention applied to the measurement of the length of the contact pattern of a loaded vehicle tire upon the ground.

Referring to the drawings, the numeral 10 designates generally the measuring device of this invention, which is preferably made from two relatively thin, narrow, elongated sections of sheet steel 11 and 12. These sections overlap to form the main body portion 13 of the measuring tool of this invention and have their ends bent, as indicated in Figure 1, at right angles to the main body to provide arms 14 and 15, thus forming a generally U-shaped tool, as shown in the drawings.

The free end of each of the sections 11 and 12, as indicated particularly well in Figure 2, is bent upon itself to form the arms 14 and 15, and each of these arms is bent in the manner shown to form earth-engaging portions 16 and 17, respectively, for a purpose hereinafter to become clear. In the form of the invention shown in Figure 1, the distance between the arms 14 and 15 is indicated as 8 inches, a range of from 7 to 8 inches being permissible, while the latter is the preferred maximum length of the contact pattern made by a loaded tire upon the ground for optimum conditions of wear and safety. It will also be noted, however, that the main body portion 13 of the device is graduated so that, if desired, the distance between arms 14 and 15 may be adjusted. Special circumstances requiring major adjustments occur, for example, in the case of trucks where extreme differences are observed between the loaded and unloaded weight upon the tires. It may be understood that the range of adjustment between the arms 14 and 15 of 7 to 8 inches is satisfactory for automobiles and other vehicles employing tires having an outside diameter of from approximately 26 to 30 inches, while for tires over 30 inches in diameter a range of 8 to 9 inches is preferable.

I have found that accurate results are obtained by measuring only the length of the contact pattern or oval made by the tire upon the ground and, as is indicated in Figure 3, this contact pattern is measured by placing the arm portions 16 and 17 flat upon the ground and pushing them under the tire at front and rear thereof. The main body portion 13 extends upwardly and outwardly at an obtuse angle to the arm portions 16 and 17, and the overlapping ends are held together by a clamping structure 18 formed of a single strip of steel bent upon itself to enclose the overlapping ends of the main tool body 13, as clearly shown in Figure 2. The free ends of the clamping structure extend upwardly and rearwardly and one end continues in the plane of the main body 13 to form a handle 19 bent at its rear end. The other end is bent downwardly to form a leg 20 which engages the ground when the arms 16 and 17 are in operating position parallel to and resting upon the ground. A bolt 21 and nut 22 secure the clamping structure 18 about the overlapping ends of the main body 13, and adjustments may be made in the tool by loosening the bolt and sliding the sections 11 and 12 relative to each other. With the arms 16 and 17 under the tire at front and rear thereof the operator attempts to move the tool longitudinally until resistance is met at the line of contact of the periphery of the tire with the ground. Too much play between the arms 16 and 17 indicates that the tire is too highly inflated. Air is then released from the tire by removing the valve cap and depressing the valve stem, until the contact oval of the tire measures approximately the distance between the arms of the measuring tool. If the arms of the tool cannot be slid into the space between the tire and the ground at front and rear thereof, the tire is under-inflated and more air pressure is required. In this manner all of the tires upon which the vehicle rests can be quickly tested for proper air pressure, thus eliminating the time-consuming and usually inaccurate trial-and-error method of checking the air pressure with a conventional pressure gauge.

As pointed out before, when the tire is under-inflated, the length of the contact pattern is greater than the distance between the arms 16 and 17 and these arms cannot be slid between the tire and the ground at front and rear thereof. In such case additional air must be supplied until the tool can be slid under the tire, and this operation is facilitated by the provision of an energy storing device 23 in the form of a strip of spring steel having one end secured to the tool by the bolt 21. This spring 23 curves downwardly back of the rear ends of the handle 19 and leg 20 and its free end is spaced from the leg 20. When the tire is under-inflated the operator presses the ends of arms 16 and 17 of the tool against the juncture of the tire when the ground and holds the tool in position by pressing the toe of his shoe against the tail of storage spring 23 and exerting pressure upon it. When he has inflated the tire to the proper pressure the energy stored in the spring 23 will urge the tool into position with the arms 16 and 17 under the tire at front and rear thereof.

The operation of my improved method and mechanism for testing the tires of automotive vehicles to determine the proper contact pattern of the tire upon the ground should be clearly understood from the foregoing description. By practicing my invention and maintaining the length of the tire's contact pattern at not more than 8 inches and not less than 7 inches, maximum wear and safety are assured and the wear upon the entire tread surface will be uniform. It should also be understood that modifications may be made in the measuring device by which my novel testing method is carried out, without departing from the spirit of the invention or the scope of the appended claims.

I claim as my invention:

1. A device for measuring the length of the contact pattern made by a vehicle tire at rest upon the surface of the ground, said device being generally U-shaped and comprising a base or handle portion of thin, narrow relatively rigid stock, spaced arms at the ends of the base portion of substantially the same material extending at right angles to the base, said arms being spaced apart and bent in a plane at an obtuse angle to the plane of the base portion, and said arms being slidable between the tire and the ground at front and rear thereof when the length of the area of contact of the tire with the ground is no greater than the spacing between said arms, and a depending member secured to said base portion and engageable with the ground to provide a stable support for the measuring device when said arms are resting upon and parallel to the ground.

2. A device for measuring the length of the contact pattern made by a vehicle tire at rest upon the surface of the ground comprising a base, parallel arms of relatively thin flat stock extending outwardly from the ends of the base, said arms being slidable between the tire and the ground at front and rear thereof when the length of the area of contact of the tire with the ground is no greater than the spacing between said arms, a leg depending from said base engageable with the ground when said arms are resting upon and parallel with the ground, and a flexible member carried by the device and adapted to be depressed when resistance is met by said arms to insertion thereof in the space at front and rear of the tire.

3. A device for measuring the length of the contact pattern made by a vehicle tire at rest upon the surface of the ground comprising a base, parallel arms of relatively thin flat stock extending outwardly from the ends of the base, said arms being slidable between the tire and the ground at front and rear thereof when the length of the area of contact of the tire with the ground is no greater than the spacing between said arms, a leg depending from said base engageable with the ground when said arms are resting upon and parallel with the ground, and an energy storage device carried by the measuring device operable upon resistance to insertion of said arms under the tire at front and rear thereof to provide energy sufficient to automatically move the arms into measuring position under the tire when the resistance is overcome.

4. A device according to claim 3, further characterized by the fact that the energy storage device is a leaf spring secured at one end to said base portion and having its free end extending rearwardly and bent downwardly to provide a resilient element.

5. A device for measuring the length of the contact pattern made by a vehicle tire at rest upon the surface of the ground comprising a base, parallel arms of relatively thin flat stock extending outwardly from the ends of the base and slidable between the tire and the ground at front and rear thereof when the length of the area of contact of the tire with the ground is no greater than the spacing between said arms, said base being formed of overlapping sections relatively adjustable to regulate the spacing between said arms, a clamping member for releasably holding said sections in adjusted position, said clamping member having a portion extending rearwardly from the base to serve as a handle, and a depending leg portion adapted to rest upon the ground when said arms are resting upon and parallel to the ground.

6. A device for measuring the length of the contact pattern made by a vehicle tire at rest upon the surface of the ground comprising a base, parallel arms of relatively thin flat stock extending outwardly from the ends of the base and slidable between the tire and the ground at front and rear thereof when the length of the area of contact of the tire with the ground is no greater than the spacing between said arms, said base being formed of overlapping sections relatively adjustable to regulate the spacing between said arms, a clamping member for releasably holding said sections in adjusted position, said clamping member having a portion extending rearwardly from the base to serve as a handle, a depending leg portion adapted to rest upon the ground when said arms are resting upon and parallel to the ground, and energy storage means for biasing the measuring device into measuring position with said arms between the tire and the ground at front and rear thereof comprising a spring carried by the base portion depressible upon encountering resistance to insertion of the arms under the tire.

References Cited in the file of this patent

UNITED STATES PATENTS

| | | |
|---|---|---|
| 1,127,204 | Dobyns | Feb. 2, 1915 |
| 1,279,645 | Bryant | Sept. 24, 1918 |
| 1,307,426 | Wells | June 24, 1919 |
| 1,788,179 | White | Jan. 6, 1931 |
| 1,906,954 | Firestein | May 2, 1933 |
| 2,087,938 | Strozut | July 27, 1937 |
| 2,545,757 | Barr | Mar. 20, 1951 |

FOREIGN PATENTS

| | | |
|---|---|---|
| 506,413 | France | Nov. 20, 1919 |